United States Patent
Lunde et al.

(10) Patent No.: US 7,613,280 B1
(45) Date of Patent: **\*Nov. 3, 2009**

(54) SYSTEM AND METHOD FOR TRANSMITTING CRITICAL COMMUNICATIONS TO A PLURALITY OF COMMUNICATION RECIPIENTS

(75) Inventors: Christopher T. Lunde, Omaha, NE (US); Debora E. Kottwitz, Omaha, NE (US)

(73) Assignee: CSG Interactive Messaging, Inc., Omaha, NE (US)

( * ) Notice: Subject to any disclaimer, the term of this patent is extended or adjusted under 35 U.S.C. 154(b) by 741 days.

This patent is subject to a terminal disclaimer.

(21) Appl. No.: 11/177,536

(22) Filed: Jul. 8, 2005

(51) Int. Cl.
*H04M 1/64* (2006.01)

(52) U.S. Cl. .............. 379/88.12; 379/88.25; 707/102; 709/207; 709/223

(58) Field of Classification Search .............. 379/67.1, 379/88.12, 88.25; 709/206, 207, 223; 707/102
See application file for complete search history.

(56) References Cited

U.S. PATENT DOCUMENTS

| | | | |
|---|---|---|---|
| 6,496,568 B1 * | 12/2002 | Nelson | 379/88.12 |
| 6,671,695 B2 * | 12/2003 | McFadden | 707/102 |
| 6,871,214 B2 * | 3/2005 | Parsons et al. | 709/206 |
| 7,174,005 B1 * | 2/2007 | Rodkey et al. | 379/88.12 |
| 7,305,448 B2 * | 12/2007 | Go | 709/207 |
| 7,324,505 B2 * | 1/2008 | Hoover | 370/352 |
| 7,340,040 B1 * | 3/2008 | Saylor et al. | 379/67.1 |
| 7,428,302 B2 * | 9/2008 | Zirngibl et al. | 379/88.12 |
| 7,454,008 B1 * | 11/2008 | Hayes et al. | 379/352 |
| 2004/0064538 A1 * | 4/2004 | Wong | 709/223 |

* cited by examiner

*Primary Examiner*—Gerald Gauthier
(74) *Attorney, Agent, or Firm*—Holland & Hart LLP

(57) ABSTRACT

A system and method are provided that deliver critical communications to a plurality of recipients, on demand, at any time and nearly anywhere. A server receives input from a client interface that defines the communication, recipient information, and broadcast information. The system contacts pre-selected groups of recipients according to client-defined hunt group. One or more different media platforms may be used for client and recipient interfaces. Text-to-speech and speech recognition technologies further broaden the usability of the system and permit over-dial or web provisioning. Recipients may be selectively transferred to a contact center or a conference bridge with other recipients in response to the communication. Access levels and user permissions may be client defined to structure the system for a client's organizational needs.

35 Claims, 18 Drawing Sheets

Add Recipient Distribution Group

Recipient Group Number 007

Group Title

Level 1  ALL

Level 2  ALL

| Recipients | Action | Recipients in this Group |
|---|---|---|
| Chris L - Chris L<br>Deb K - Deb K<br>Heidi H - Heidi H<br>JayL - Jay L<br>LindaL - Linda C<br>Mary - Mary D<br>pauiw - Paul W<br>SteveG - Steve G | [>]<br>Add to Group<br>[<]<br>Remove from Group | -- No Recipients -- |

Add Group

Critical Communications Portal

Manage Recipients
Recipient Profiles
Distribution Groups

Messages
Voice
Email
Text

Broadcast Setup
Schedule

Reports
Active Broadcast Status
Broadcast Detail
Broadcast Summary

Administration
Access Levels
User Logins
Change Password

Help
Exit

Email Message List

Create New Message

| Email Number | Email Title | Last Change | Bytes |
|---|---|---|---|
| 100 | Initial email for first contac | 06/02/05 12:45 | 286 |
| 101 | Follow up Email Notification | 06/02/05 12:46 | 236 |
| 102 | Final Email for All Clear | 06/02/05 12:47 | 141 |
| 103 | Email to Manager | 06/02/05 12:47 | 140 |
| 104 | Email to Special Purpose Team | 06/02/05 12:47 | 88 |
| 105 | Email to Crisis Management Tea | 06/02/05 12:47 | 104 |

Critical Communications Portal

Manage Recipients
Recipient Profiles
Distribution Groups

Messages
Voice
Email
Text

Broadcast Setup
Schedule

Reports
Active Broadcast Status
Broadcast Detail
Broadcast Summary

Administration
Access Levels
User Logins
Change Password

Help
Exit

New Broadcast Setup

Manage Recipients
Recipient Profiles
Distribution Groups

Messages
Voice
Email
Text

Broadcast Setup
Schedule

Reports
Active Broadcast Status
Broadcast Detail
Broadcast Summary

Administration
Access Levels
User Logins
Change Password

Help
Exit

Select the Recipient Group: All Users / 001 - First Response Team / 002 - Bus Continuity Team / 003 - Crisis Management Te / 004 - Damage Assess Team Select Voice Message: 000 - No Voice Message
Select Answering Machine Message: 000 - No Answering Machine Message
Select Email Message: 000 - No Email Message
Select Text Message: 000 - No Text Message
Attempts: 2
Delay: 5 Minutes
Prompt for Conference Bridge: ☐
Conference Number: 8001231234

Would you like to start now? [Start Broadcast]

Would you like to start in the future? 06/02/05 at 12:54 [Schedule Broadcast]

FIG. 11

Critical Communications Portal

Recipient Detail and History

Broadcast ID eyZLVF29KV Account 469963

| Account Identifier | Mary |
|---|---|
| Name | Mary D |
| Phone1 | 4023984128 |
| Phone2 | |
| Phone3 | |
| Phone4 | maryd@prairiesys.com |
| Phone5 | |
| Email | xxxxxxxxx@qwestmp.com |
| Text | |
| Final Status | No contact |

Call History

| Number | End Date/Time | Duration | Node/Port | Status | Call Recording |
|---|---|---|---|---|---|
| 402-398-4128 | 06/02 13:07 | 21 | vox2 / 0 | Ans Machine | Listen |
| 402-398-4128 | 06/02 12:57 | 8 | vox2 / 0 | | Listen |

Manage Recipients
Recipient Profiles
Distribution Groups

Messages
Voice
Email
Text

Broadcast Setup
Schedule

Reports
Active Broadcast Status
Broadcast Detail
Broadcast Summary

Administration
Access Levels
User Logins
Change Password

Help
Exit

SYSTEM AND METHOD FOR TRANSMITTING CRITICAL COMMUNICATIONS TO A PLURALITY OF COMMUNICATION RECIPIENTS

BACKGROUND OF THE INVENTION

1. Field of the Invention

The present invention relates to systems and methods for transmitting critical communications to a plurality of communication recipients and more particularly to an adaptable system and method that can receive critical communication data and recipient contact information from a remotely networked client, contact a plurality of recipients using multiple delivery media, confirm its contact with the recipients' interfaces and deliver the critical communications to the recipients.

2. Description of the Prior Art

Oftentimes, organizations both large and small need to send a critical communication to groups of employees, end-users, customers or families. Sometimes the critical communication relates to matters requiring immediate notice, such as the closing of a school or plant for one reason or another. Other times, the critical communication may concern an emergency situation, such as a severe weather warning. These situations require speed and accuracy to address an urgent matter. However, sometimes organizations simply want to simultaneously pass good news, such as the company's exceptional performance results, to a large group of employees or investors. Until the present invention, however, the ability to easily and quickly deliver voice and/or text messages to predefined and customized calling lists, on the fly, with special information as needed, was unavailable.

The prior art is filled with systems for delivering messages that are simply inadequate for broad dissemination of a critical communication. For example, when an emergency has occurred at a school and the students must be sent home immediately, the school staff must typically search for emergency contact information for each of the students and place hundreds of separate calls, which is vastly inefficient and time consuming. An announcement can be delivered to a local radio station for public address, but the parents may not be listening to the radio, let alone one or more particular stations. In the end, few parents are quickly reached and the message will not reach every parent.

E-mail has the capability of delivering a message to several individuals, but it requires the individuals to access a computer device to receive the message. When some of the individuals are in their cars, at work outdoors, or simply away from their computers, the e-mail message will simply sit in an inbox, unread. Moreover, e-mail communications cannot convey voice messages or other audible tones, unless the end-user provides a receiving device that is capable of converting a text message to an audible message. If the e-mail address is no longer good, or the e-mail simply goes undelivered for countless other reasons, the individual sending the message may or may not receive a reply that the message was not delivered. Regardless, redundant contacts are not available on e-mail mailing lists, let alone contacts for multiple media types, such as phones, pagers, fax machines, etc. More importantly, the individual sending the message cannot draft and send an e-mail to recipients if the individual does not have access to a computer device. A new system is needed that is able to make use of e-mail as one of a plurality of media platforms, using multiple contacts for each contact recipient so that the shortcomings of any one media platform or contact does not prevent a timely and accurate transmission of the critical communication.

Accordingly, what is needed is a system that is capable of delivering personalized, time-critical communications to groups of any size from a handful to many millions, on demand, anywhere, at any time. Such a system must also provide the flexibility of using various media platforms for both the messenger and the message recipients.

SUMMARY OF THE INVENTION

The present invention provides a system for transmitting a personalized communication from a client to a plurality of communication recipients at any time. In a preferred embodiment, the system is generally provided with a client interface that is operatively coupled with a server by a network connection. Several different types of recipient interfaces may be used to receive the communication from the server, such as telephones, computer devices, fax machines, pagers, and the like. Software is provided on the server that receives recipient contact information, relating to each of the recipient interfaces for each intended communications recipient. The recipient contact information is stored in one or more predefined groups of communication recipients. The client provides input that defines the message within the communication. The particular recipients for the communication are also defined, using the client interface. Broadcast input is provided by the client that dictates whether the communication is sent immediately or at a scheduled date and time. When the client-selected time arrives, the server attempts to contact the particular group of communication recipients. The software is provided in a manner that permits the server to record contact data, relating to the attempts to contact the recipients, and formulate the contact data into one or more broadcast reports, which may be presented real-time, when desired.

In one preferred embodiment, a client initiates the communications from a computer device, using a secure, browser-based website. Another embodiment permits the client to use a telephone to initiate the communication. Speech recognition and text-to-speech capabilities may be provided for formulating and delivering the communications, depending upon the needs of the client and recipient interfaces provided. The software may be provided to phonetically interpret data in order to ensure that the communication is delivered accurately. A plurality of different "voice personalities" and languages may also be selected to increase the effectiveness of delivering the communication.

In a preferred embodiment, the recipient contact information is defined in "hunt groups", so that recipients can be reached via a series of contact numbers in a hierarchy of their choice, based on contact location, type of interface, or both. Repeat contact attempts may be selected, as well as the time and frequency of the subsequent attempts. In another preferred embodiment, the system provides the ability to connect recipients to a voice bridge for an on-demand conference call. A client-defined message may also be left where appropriate. In that instance, the system may be set up to receive inbound calls from the communications recipients or direct them to a client calling center.

The software may also be provided such that it enables the system to receive input from a client interface that defines one or more user roles and responsibilities. These roles and responsibilities may be provided to define access to and control over one or more types of input received from client interfaces, such as access to recipient contact data and control over the message within the communication, the rate at which the system attempts to contact recipients, the date and time the contact attempts occur, and the frequency with which the contact attempts occur.

It is therefore a principal object of the present invention to provide an automated system for transmitting personalized, consistent, time-critical communications to a plurality of recipients, on demand.

A further object of the present invention is to provide an automated system for transmitting personalized, time-critical communications to a plurality of recipients that is sufficiently flexible to use various media platforms for both the client communicator and the recipients.

Still another object of the present invention is to provide an automated system for transmitting time-critical communications to a plurality of recipients that is also capable of receiving communications data from a client communicator using a phone or computer device.

Yet another object of the present invention is to provide an automated system for receiving time-critical, text communications from a client communicator and transmitting the communications in an audible form to a plurality of recipients.

A further object of the present invention is to provide an automated system for simultaneously transmitting time-critical communications to a plurality of recipients across multiple, different media platforms.

Still another object of the present invention is to provide an automated system for transmitting time-critical communications to a plurality of recipients according to a hunt group defined for each recipient.

Yet another object of the present invention is to provide an automated system for transmitting time-critical communications to a plurality of recipients that is also capable of transferring recipients to a live operator, an interactive voice response application, or a conference bridge with other recipients.

A further object of the present invention is to provide an automated system for transmitting time-critical communications to a plurality of recipients that is also capable of detecting a recipient's answering device and leaving an instructive message for the recipient.

Still another object of the present invention is to provide an automated system for transmitting time-critical communications to a plurality of recipients that is further capable of incorporating text-to-speech and speech recognition technologies to personalize the communication and increase usability of the system.

Yet another object of the present invention is to provide an automated system for transmitting time-critical communications to a plurality of recipients that is also capable of compiling data, relating to attempts to contact recipients, as reports that may be viewed by a communications client in a real-time fashion.

Still another object of the present invention is to provide an automated system for transmitting critical communications to a plurality of recipients that is further capable of receiving input from a client interface that defines one or more user roles and responsibilities, which define access to and control over one or more types of input received from client interfaces.

These and other objects of the present invention will be apparent to those having skill in the art.

BRIEF DESCRIPTION OF THE DRAWINGS

FIG. 6 depicts one contemplated embodiment of an add/edit recipient group screen, which could be used within the present invention;

FIG. 8 depicts one contemplated embodiment of an add/edit audio message screen, which could be used within the present invention;

FIG. 9 depicts one contemplated embodiment of an e-mail communication menu screen, which could be used within the present invention;

FIG. 10 depicts one contemplated embodiment of an add/edit e-mail communication screen, which could be used within the present invention;

FIG. 11 depicts one contemplated embodiment of a broadcast setup/schedule screen, which could be used within the present invention;

FIG. 13 depicts one contemplated embodiment of a recipient detail and communication history screen, which could be used within the present invention;

FIG. 16 depicts one contemplated embodiment of an add/edit user screen, which could be used within the present invention;

DESCRIPTION OF THE PREFERRED EMBODIMENT

Figure 1:
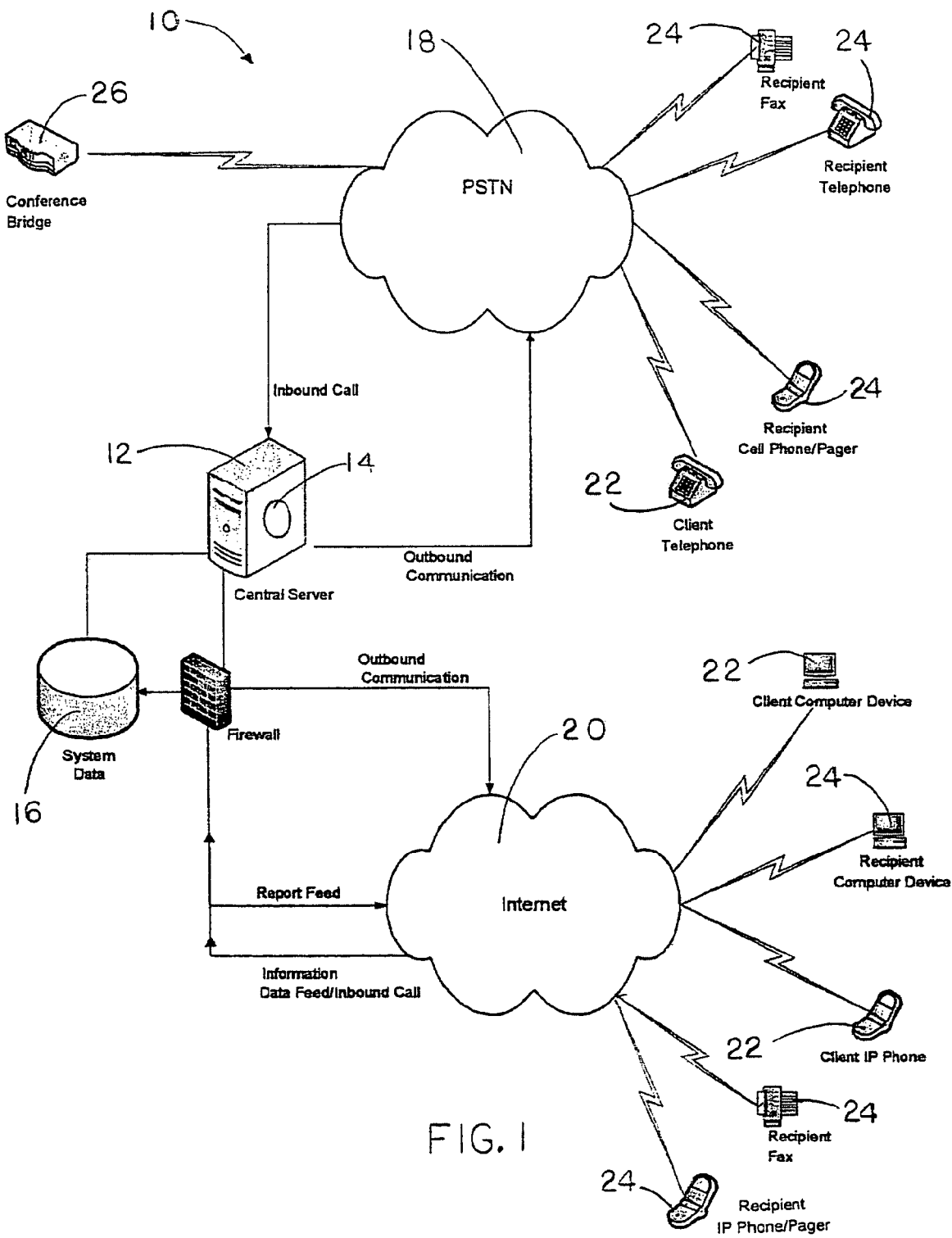
FIG. 1 depicts a general system overview of one embodiment of the present invention as the same could be arranged to receive input from a client regarding a critical communication and transmit the critical communication to a group of communications recipients.

In the following detailed description of exemplary embodiments, reference is made to accompanying FIGS. 1-18, which form a part hereof and show by way of illustration exemplary embodiments of the present invention. These embodiments are disclosed in sufficient detail to enable those skilled in the art to practice the invention. It is to be understood that other embodiments may be utilized, however, and other changes may be made, without departing from the spirit or scope of the present invention. The following detailed description is, therefore, not to be taken in a limiting sense, and the scope of the present invention is defined only by the appended claims.

The system 10 is generally comprised of a central server 12 having at least a processor 14, a data storage medium 16 and a known communications means, such as a modem, network card, or other similar interfacing device, for accessing a communications network, such as a publicly switched telephone network (PSTN) 18, the Internet 20, a limited environment intranet, satellite, data link, or the like. Regardless of the type of communications network accessed by the central server 12, it is contemplated that the network connection could be made via a landline or wireless connections.

One or more client interfaces 22 should be provided that may be selectively placed in communication with the central server 12 via the communications network. In a preferred embodiment the client interface 22 is a computer device capable of transmitting data, such as PC, laptop, PDA and the like, having communications means, such as a modem, network card, wireless or radio transmitter, or other similar interfacing mechanism, for accessing the communications network. Such computer devices will facilitate a browser-based portal that supports a single point of entry for easy, on-line access to the system 10. The computer devices further provide the ability to receive text and audio-based data from a client for transmission to the central server 12. It is further contemplated, however, that the client interface 22 could be provided in the form of a telephone, which includes cellular telephones, landline telephones and the like. Such interfaces will be capable of receiving verbal and DTMF input from a client and transmit the input to the server 12 via the network. Accordingly, it will be preferred that the system 10 be provided with software that is operative to receive and transmit audible data in both verbal and DTMF formats. Speech recognition and text-to-speech applications are preferably provided to assist the system 10 in the receipt and transmission of data.

A plurality of recipient interfaces 24 are provided that are capable of receiving data transmissions from the server 12 over the communications network. The preferred flexibility of the software on the server 12 will enable the recipient interfaces 24 to take the form of a computer device, such as a PC, laptop, PDA, paging device, fax machine, and the like. However, a telephone or cell phone, whether wireless or landline-based, will be more than adequate for recipients to receive transmissions from the server 12. As discussed in greater detail below, it may also be preferable for the recipient interfaces to be capable of transmitting text or audio-based data to the server 12 in response to data received from the server 12.

Figure 2:
FIG. 2 depicts one contemplated embodiment of a recipient profiles screen, which could be used within the present invention.

FIGS. 2-18 depict example screen images where a browser-based web application is desired. However, as mentioned previously, each of the following interactions between the server 12 and the client interface 22 could be accomplished where the client interface 22 is a telephone of various types. Regardless of the type of client interface 22 employed, the system software should be provided in a manner that allows the central server 12 to receive, store and organize recipient contact information according to the needs of a client. For example, FIG. 2 depicts a recipient profile screen that provides a list of recipients that have been previously entered into the system 10. The table depicted demonstrates some of the recipient contact information that may be stored within the system 10, including the recipient's account identifier, name, primary telephone contact, secondary telephone contacts, e-mail address, and text messaging address. It is contemplated that fewer or more of each type of recipient contact may be provided, as well as types of media platforms used by the recipients. By selecting an individual account identifier, a user is able to view more detail regarding that recipient's information, edit the information or delete the same.

Figure 3:
FIG. 3 depicts one contemplated embodiment of an add/edit recipient screen, which could be used within the present invention.

FIG. 3 demonstrates one preferred embodiment of an add/edit recipient screen, wherein the user is able to enter a new recipient to a master list of recipients. An account identifier is selected for that particular recipient and entered accordingly. The recipient's proper name is then included. In one preferred embodiment, a spoken spelling entry is provided to allow the phonetic spelling of the recipient's name to be entered, where the recipient's name is spelled or pronounced in an unusual manner. In that embodiment, the software will be provided in a manner that reads the phonetically spelled name and pronounces it, using text-to-speech software, according to basic, pre-defined phonetic pronunciation rules using text-to-speech technology. An "original password" may be added, where the recipient information is being added by an administrator, permitting the administrator, the recipient or other information managers to later provide a new password for security purposes.

In a preferred embodiment, the software should be provided in a manner that is capable of receiving a plurality of different recipient contacts relating to different recipient interfaces, including telephone and cell phone numbers, e-mail addresses, text messaging addresses, fax machine numbers, paging device numbers, and the like. Where a plurality of contacts for a single user are provided, it will be preferred that a "hunt group" be used to prioritize the contacts according to the preferred order in which the recipient is most likely to be reached. For example, the first telephone number may be a cell phone number, whereas the second number entered may be a work telephone number, followed by a home telephone number. It is preferred that the software be capable of managing the contacts, according to the desired hunt pattern, and attempt to contact the recipient according to that order, until the recipient is contacted. Another preferred option, shown in FIG. 3, provides the user of the system 10 the ability to assign an "owner" to the recipient's contact information. This ownership will provide an administrator, local manager, or the like, the ability to utilize the recipient's contact information in the dissemination of one or more critical communications, according to the client's needs. Once the recipient's information is satisfactorily entered, the "add recipient" button may be selected to save the data within the system 10.

Figure 4:
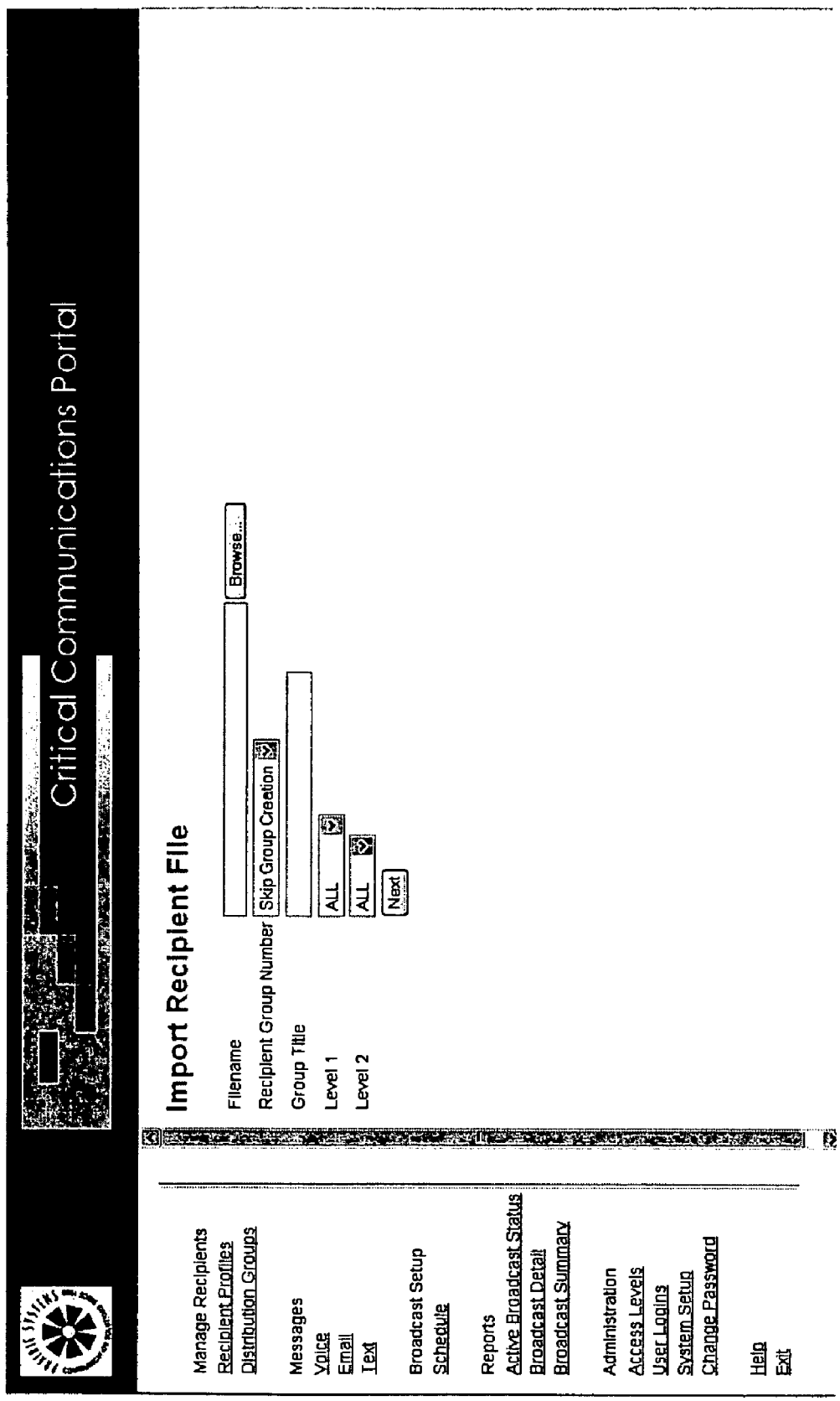
FIG. 4 depicts one contemplated embodiment of a recipient data import screen, which could be used within the present invention.
Figure 5:
FIG. 5 depicts one contemplated embodiment of a recipient group menu screen, which could be used within the present invention.

FIG. 4 demonstrates one possible screen that allows the client to import a data file containing contact information for one or more recipients. It is contemplated that the client may simply export the file from the file's existing location and manage the manner in which the application uses the recipient data. File mapping may be used to define the manner in which the application will use the data fields from the imported file. FIG. 5 depicts one preferred embodiment of a distribution group menu screen, which shows the list of recipient groups that have been defined within the system 10. The table depicted contains an overview of the distribution groups. A user may view more detail, edit and delete a distribution group by simply selecting the associated group number. FIG. 6 depicts one contemplated embodiment of an "add and edit" screen for recipient groups. This screen allows a user to create a new distribution group, delete or edit existing distribution groups. A recipient group number may be assigned to the newly added group, as well as a title, so that the group may be easily identified. As with the individual recipient contact information, it may be preferred to provide a manner of selecting ownership levels for the recipient group being created. This will allow only certain managers to utilize the information for communication dissemination. A recipient column provides a list of those recipients available for adding to the group being created. A second column is provided to display those recipients who have been added to the group and can be used to remove recipients from a group. By selecting "add group", the distribution group is saved to the system 10 for future use.

Figure 7:
FIG. 7 depicts one contemplated embodiment of a voice communication menu screen, which could be used within the present invention.

FIG. 7 depicts one contemplated embodiment for a voice message menu screen, which lists voice messages that are currently within the system 10. The table depicted provides an overview of the existing messages, including a title for the message, a date and time of its last change, and an indication of its duration. Further detail may be viewed and the messages may be edited or deleted by simply selecting the voice number identifier for a particular message.

Figure 8:
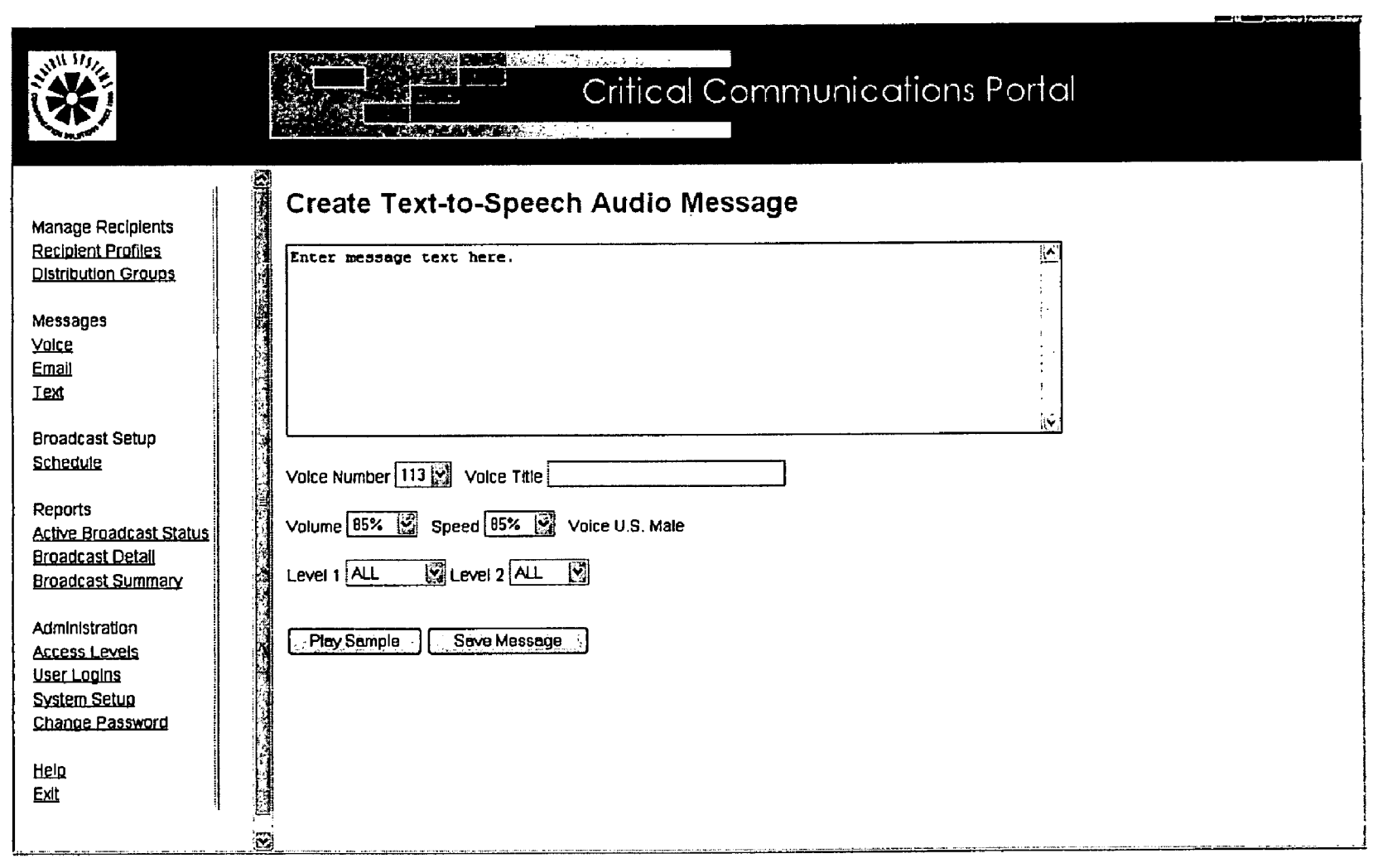

FIG. 8 depicts one possible embodiment of a screen provided to enable a client to create a new communication, using text data. The desired message or communication is typed directly into the text box. A message number and message title may then be selected to identify the communication. In one preferred embodiment, a plurality of different "voices" and languages may be provided as options to the client. For example, it may be preferred that the communication be delivered, using a male or a female voice that is speaking in English or Spanish. Where that option is provided, indication on the screen as to the voice selected should be provided. It may also be preferred that the volume and speed of the message be adjusted to optimize the communication's performance. Depending on the voice selected by the client and the content of the communication, a particular volume and speed at which the communication is delivered may play a significant role in the manner in which the communication is received. In order to provide the client with the basis on which the client may decide the volume and speed at which the communication is delivered, a "play sample" icon should be provided that will play the message for the client, using text-to-speech software. Again, ownership levels for the particular message may be entered, when desirable. Once the message is satisfactory to the client, "save message" may be selected to save the message to the system 10.

Figure 10:
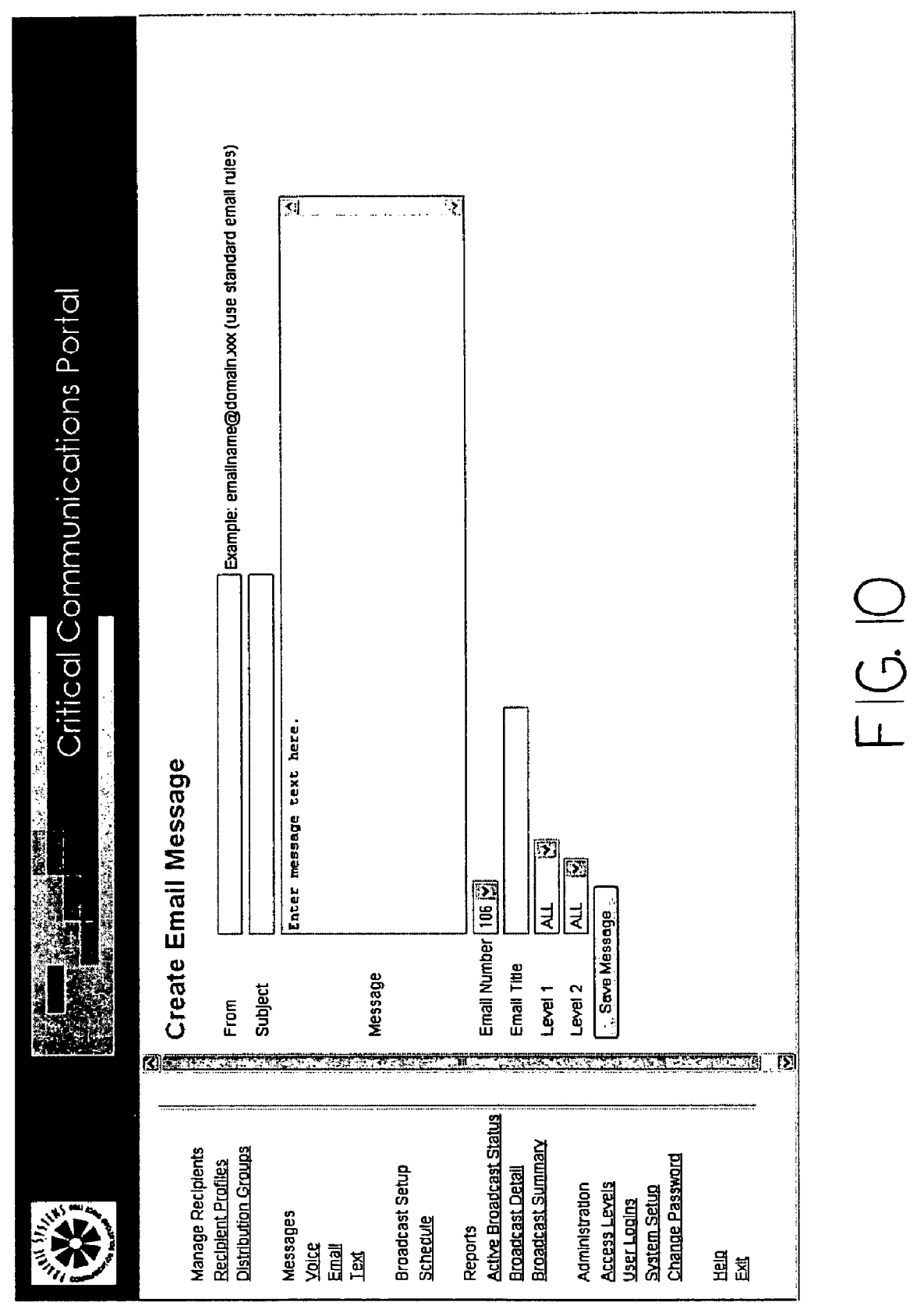

FIG. 9 depicts an e-mail message menu screen that may be incorporated with the system 10. As with the voice message menu screen, the e-mail message menu screen identifies e-mail messages saved to the system 10 and provides general information relating to each particular message. FIG. 10 depicts one possible embodiment of a screen that may be used by a client to create an e-mail message, which will be the subject of the disseminated communication. A "from" field permits the client to enter a valid e-mail to which the message recipients may reply, as needed. The subject of the communication, and the message therein, may then be entered by the client. A message number and e-mail title are then selected to properly catalog and identify the communication for future use. As with the previous communications, levels of ownership may be defined for the communication's use by one or more particular managers. Once the communication is prepared, the message may be saved by selecting the "saved message" icon. Screens similar to the e-mail message menu screen and e-mail message creation screen may be provided that will further serve the client in managing and creating text messages to be sent as a critical communication to the chosen recipient group.

FIG. 11 depicts one contemplated embodiment of a broadcast set up and scheduling screen, which may be utilized by a client when it is ready to schedule the broadcast of a communication. First, the client would typically select a designated group of recipients to receive the communication, from a list of recipient group identification numbers and titles. In a preferred embodiment, the client may then select from the various lists of voice messages, answering machine messages, e-mail messages, text messages, and the like. Where, for example, no e-mail message has been provided by the client, no e-mail message needs to be selected for the broadcast being set up. As the broadcast is initiated, the software will commence its contact attempts according to the hunt groups defined for the particular recipient group chosen and transmit the communications according to the selected available media platforms. Accordingly, in this example, no e-mail messages would be transmitted despite the fact that one or more recipients within the selected group would have provided an e-mail contact as one of its chosen contacts in the hunt group. The client may select the number of attempts that the client wishes to have the system perform. A delay may also be selected to establish a time period between the number of different contact attempts. The client may then simply select when to send the broadcast. One option is to initiate the broadcast immediately. Another option is to enter a specific day and time in order to send the broadcast at a certain point in the future.

In one preferred embodiment, it may be preferable to provide the option of a prompt for a conference bridge to be made available to the communications recipients. This is a pre-configured option that is used to bridge a call between one or more of the recipients to a live client representative, contact center, or a message board/IVR system. Another pre-configured option would be to simply provide the conference bridge in a manner that places a plurality of the communication recipients in open communication with one another over the network, after the initial communication has been transmitted to the recipients by the system 10. In either such embodiment, or a variation thereof, a conference bridge device 26 is provided such that it is in communication with the communications network and the central server 12, so that the calls may be routed accordingly. One of various known conference bridge devices will suffice for such contemplated applications.

The system 100 will initiate the broadcast of a communication according to the communication input received from the client (regarding the particular message being conveyed), the recipient input received from the client (regarding the identity of a group of communication recipients selected), and the broadcast input received from the client (regarding the time in which the central server 12 will attempt to contact the particular group of communication recipients). The central server 12 will contact the individual recipients for the selected groups, according to the hunt order identified for each particular communications recipient. It is contemplated that the system 10 will initiate the transmission of the communication through one or more simultaneous telephone calls over a PSTN, e-mail or text message transmissions, faxes, etc. Preferably, the software is provided in a manner that is capable of transmitting the communication simultaneously, or in close proximity with one another, to multiple, different media platforms over various types of communications networks. Depending upon the contemplated application for a particular system, various known switch boards for accessing a PSTN, internet and other such communications networks will need to be coupled with the central server 12 to accommodate the outbound calling load.

As the system 10 attempts to contact each individual recipient interface, various tools should be made available to increase the accuracy and usability of the overall system 10. For example, the system 10 may utilize software capable of "live answer detection" and "advanced answering machine detection" alone or in combination with one another. In classic answering machine detection processes, the system 10 waits for the call to be answered. The system 10 listens for a short greeting followed by silence, which is the most typical pattern for a live answer. The system 10 then transmits the communication to the recipient. However, if the greeting or "noise" on the other end of the line goes beyond the predefined time period for an initial greeting, which is the most typical pattern for an answering machine or voice mail greeting, a separate answering machine message may be played for the communications recipient. The answering machine message may simply indicate that a critical communication is available for the recipient and provide for the relevant contact information for the communications recipient to place an inbound call to the system 10. Accordingly, the software provided within the system 10 in this example should be provided with the capability of receiving and directing inbound calls according to recipients, for whom an answering machine message was left.

With advanced answering machine detection processes, the system 10 plays a live answer message as soon as the call is picked up by the recipient, while listening to the greeting at the same time. If the system 10 continues to detect noise for a time period greater than the pre-determined "typical" greeting, the system 10 stops the live message, waits for the noise of speech from the other end of the lined end and either ends the call or begins transmitting an answering machine message. The system 10 should be provided with software capable of tagging the message as a "no answer" or "answering machine message left" and proceed to continue attempting "live" delivery of the communication by attempting to contact the next communication contact in the recipient's profile.

It is contemplated that there may arise certain occasions where a critical communication may need to be transmitted to only certain portions of a recipient group. For example, where severe weather is quickly approaching a portion of a region occupied by the group of contact recipients, the severe weather may not affect all of the contact recipients. Accordingly, it is contemplated that the software provided to the system 10 should be provided with a contact exclusion capability that permits further customization of the broadcast by excluding a portion of the selected contact group. It is contemplated that one manner in which the call exclusion process could be facilitated is to exclude contacts having a particular area code or other similar piece of contact information, relating to the recipients' location.

Similarly, there may arise a particular situation where a communications recipient may not be reached at any of the points of contact provided for that recipient on its recipient information list. Accordingly, whether or not the recipient's unavailability is anticipated, the software may be provided with an "alternate contact" option that allows the communication to be transmitted to another individual, who is authorized to receive the communication on behalf of the intended recipient. The alternate contact information may be selectively included with the recipient contact information at any time.

In still another embodiment, it may be desirable to override caller ID information relating to the specific network line being utilized by the system 10 to contact the recipients. It is common for many people to screen or block unknown numbers for various reasons. Accordingly, if the inbound communication from the system 10 is blocked or screened by the recipient, the communication may go unreceived. Therefore, the software may preferably be provided in a manner that permits the selection of a unique and meaningful caller ID to be transmitted as the caller ID when the communication is being attempted by the system 10. For example, it may be desirable for a company to simply sub-plant a particular manager's telephone number in place of the line associated with the server 10, in the hopes that the recipient will answer the incoming transmission.

In still another preferred embodiment, it may be desirable for the client to record one or more particular communications being transmitted by the system 10. In one example, random whole call recording may provide a means to monitor calls to ensure that call flows, language and outcomes are optimized. The software provided to the system 10 in that situation will be adapted to receive input from the client according to the frequency and number of recordings by the system 10. Accordingly, based upon the client's perceptions after having reviewed the recorded calls, the clients may change the script of the communication, change the time at which the communications are attempted, or other such parameters.

The client may desire the ability to control the rate at which the system 10 attempts to contact the recipients. This may be critical when call centers are involved in the equation for the client. If the outbound communications are transmitted to quickly or to close in proximity with one another, a call center may receive inbound communications from the recipients in a volume that the call center is not prepared to handle. Likewise, the rate of the broadcast may be increased, where expected inbound calls will be limited according to the available call center resource.

Figure 12:
FIG. 12 depicts one contemplated embodiment of a broadcast detail menu screen, which could be used within the present invention.

In its preferred embodiment, the system 10 should be provided with software that is capable of at least temporarily recording contact data, relating to the systems' attempts to contact the particular group of communications recipients and formulate the contact data into one or more broadcast reports. FIG. 13, depicts one possible embodiment of a broadcast detail screen that lists completed communications broadcasts, providing information such as the broadcast ID, the start and end times of the broadcast, and other information relevant to the client. It may be desirable to provide a simple search engine that permits the client to search for completed broadcasts from one particular date to another, as depicted. FIG. 12 depicts a possible detail and history report for a particular call recipient within a particular communications broadcast. The information may provide the recipient's name and the contact information used by the system 10. A final status such as "no contact" may be provided. Specific call history information relating to the contact attempted, the date and time of the contact, the duration of the call and status of the contact may also be provided. The system 10 may be provided with software having advanced retry logic that ensures that when a destination is not reached, the delay is appropriate based upon "busy", "no answer", "no ring" and when there is a particular unexpected result at the destination. This provides a means to optimize the contact attempts and get in touch with the recipient. This will benefit the client in structuring the frequency and number of retries, according to the type of communication being transmitted. For example, a critical communication may use the retry function of the system 10 more frequently where a busy signal is detected by the system 10 as opposed to the detection of an answering machine.

Figure 14:
FIG. 14 depicts one contemplated embodiment of a broadcast summary menu screen, which could be used within the present invention.
Figure 15:
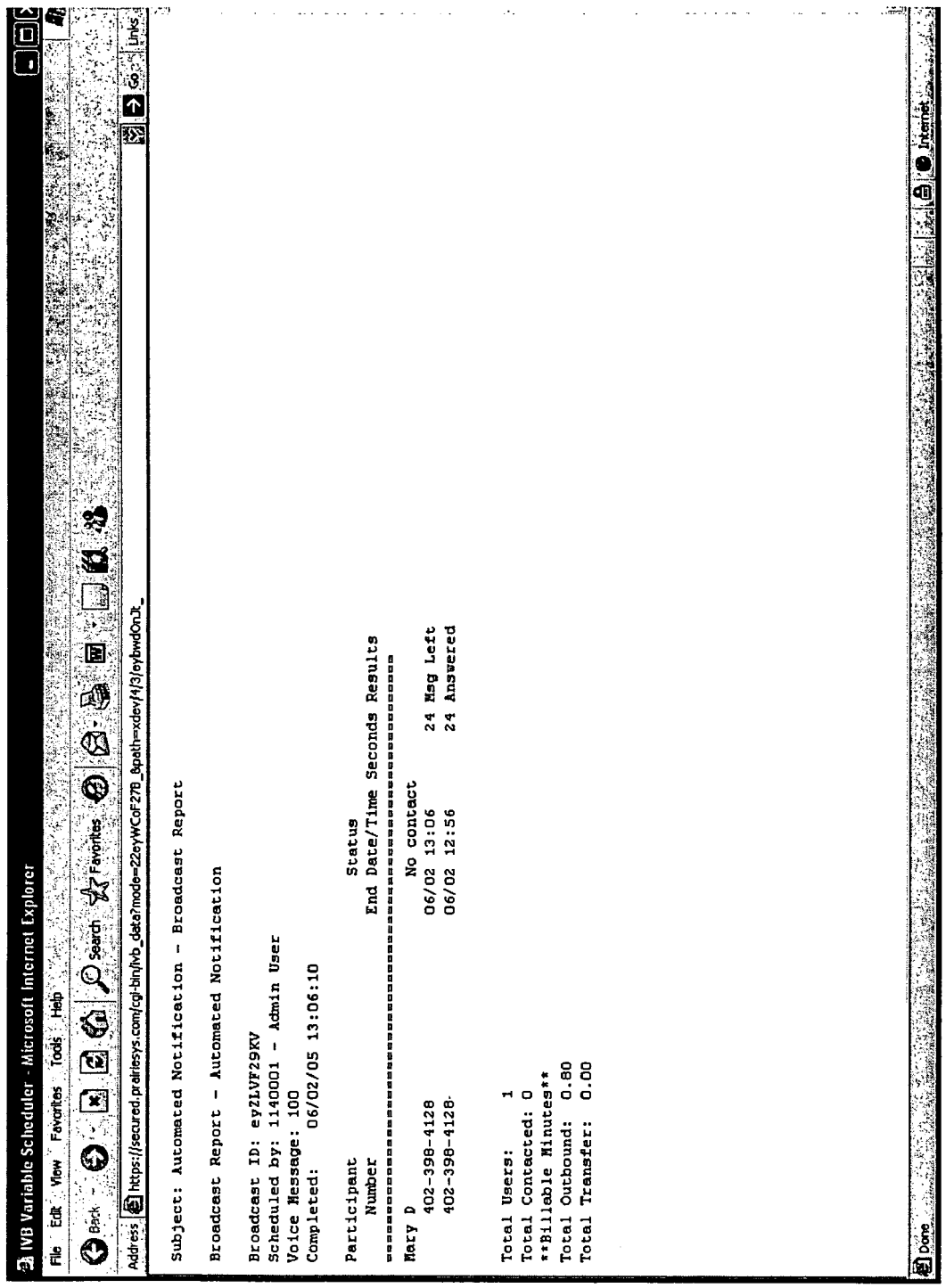
FIG. 15 depicts one contemplated embodiment of a broadcast detail screen, which could be used within the present invention.

A broadcast summary screen, such as that depicted in FIG. 14, may be provided to show a list of all broadcasts that have been sent for a particular client. Basic broadcast identification information, relevant date and time information, as well as size of the outbound broadcast may be provided in such a report. When a particular broadcast ID is selected, a second broadcast summary detail report may be provided, such as that depicted in FIG. 15.

For various security reasons, access to the various data components within the system 10 may require various restrictions, according to the client's needs. For example, the software provided to the system 10 will preferably provide a log in and password/PIN prompt to users attempting to access the system 10 and the databases therein. As new recipients are added, each recipient may be supplied with a password/PIN from the client in order to access the system 10 and enroll with that particular client. This provides the option of allowing the recipient to individually control their contact information and update the same accordingly. Recipients will typically only have access to their individual profiles, with access to the communications input, broadcast input, and the like being restricted to one or more administrators or managers assigned by the client.

Figure 16:
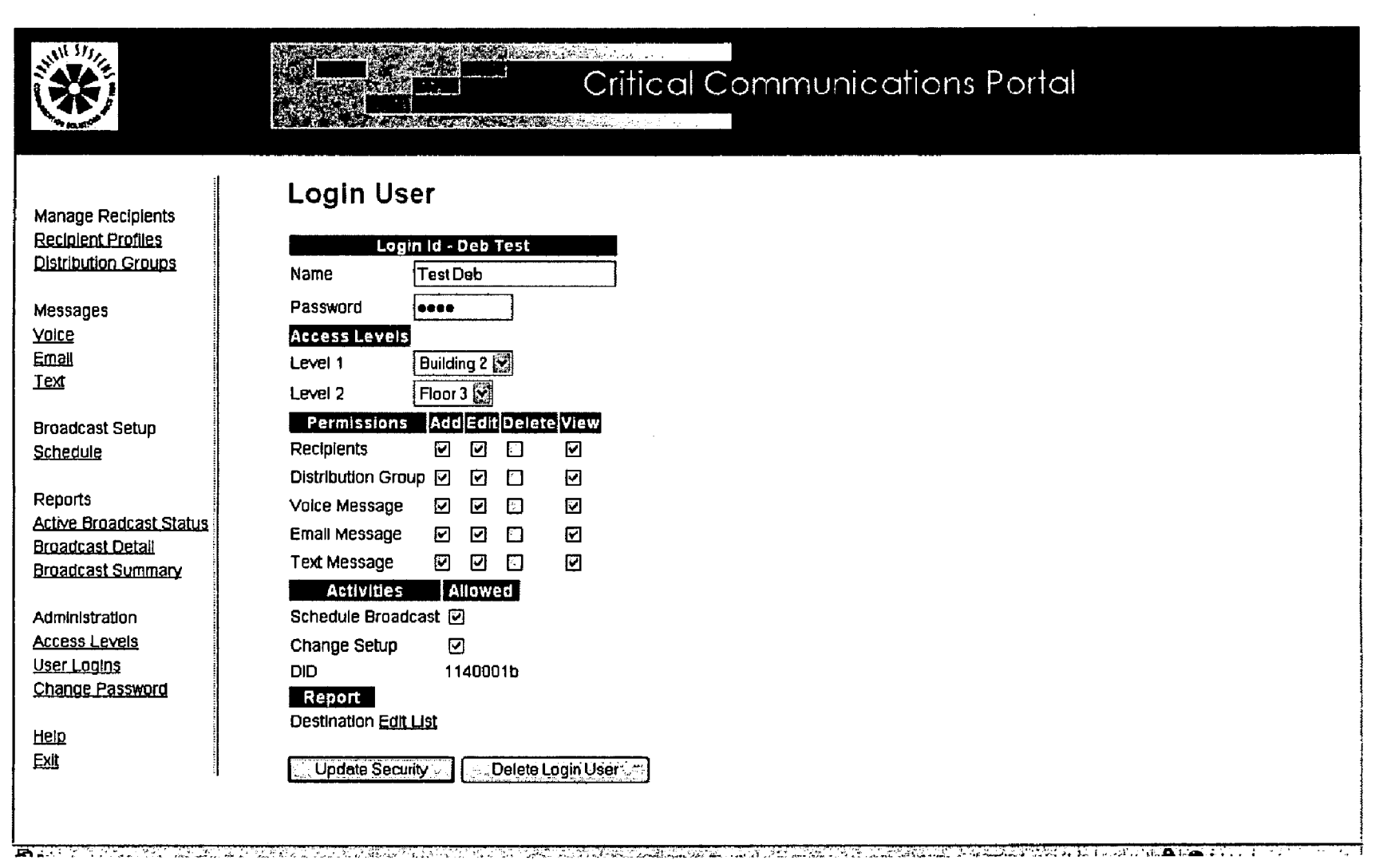
Figure 17:
FIG. 17 depicts one contemplated embodiment of an access levels management screen, which could be used within the present invention.
Figure 18:
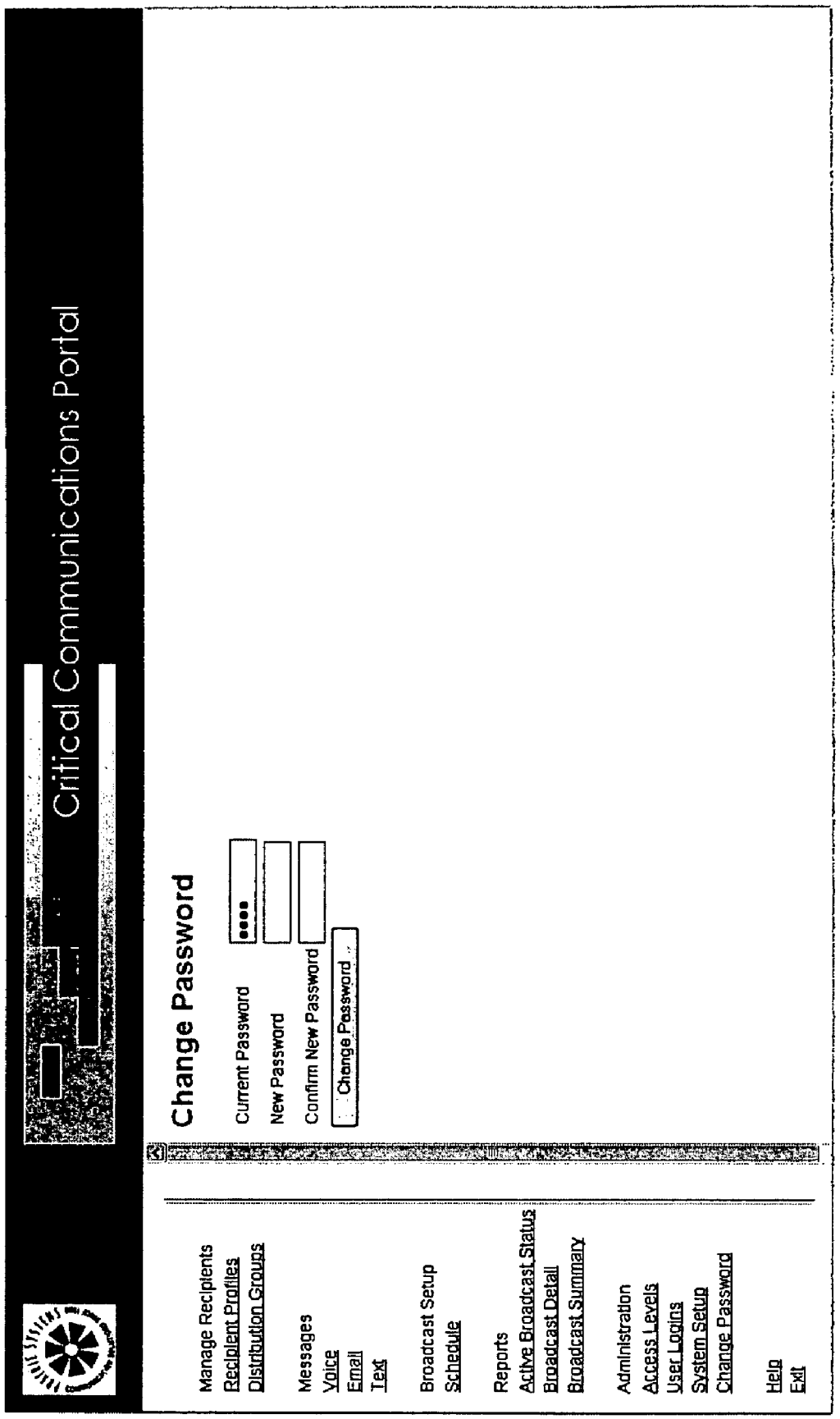
FIG. 18 depicts one contemplated embodiment of a change password screen, which could be used within the present invention.

Access levels and permissions may be parsed in a nearly endless number of ways, for a wide array of activities on the system 10. Essentially, the software should simply be operative to receive input from the client interface that defines one or more user roles and responsibilities, which define access to and control over one or more types of input received from the client interface or a recipient interface. More specifically, however, the system 10 should be capable of receiving input from the client interface that creates one or more "access levels" that define access to and control over recipient input, including the specific contact information for each individual communications recipient. These access levels may further define access to and control over communication input from the client, relating to the message set forth within the individual communications being transmitted. For example, a level 1 access level may be provided as the highest level of access and security, which enables a user to manage an entire application. Such users are typically responsible for a location, such as a plant, region or building. Roles can be created and assigned within this level, at the discretion of the client. A level 2 user, however, is provided with a more restricted level of access and security. A level 2 user is normally under the umbrella of a level 1 user, having various support roles related to the application. Based upon a user's assigned access level and role, various activities, such as changing fundamental application options and behaviors or the management and scheduling of communications broadcasts, may be provided. Various application features within the system 10, which permit a user to add, edit, delete or view existing recipient lists or communications messages, may also be assigned as one or more types of "permissions" according to the access level and roles assigned to particular users. FIG. 16 provides one example of a screen that may be presented for defining the password, access levels, permissions, and activities that are available to a particular user. FIG. 17 depicts one possible embodiment of an access levels management screen, which permits entries to be added, deleted or edited for each of the various access levels. Likewise, FIG. 18 provides an example of a screen that allows a user's password to be changed.

In the drawings and in the specification, there have been set forth preferred embodiments of the invention; and although specific items are employed, these are used in a generic and descriptive sense only and not for purposes of limitation. Changes in the form and proportion of parts, as well as substitution of equivalents, are contemplated as circumstances may suggest or render expedient without departing from the spirit or scope of the invention as further defined in the following claims.

Thus it can be seen that the invention accomplishes at least all of its stated objectives.

We claim:

1. A system for transmitting a critical communication from a client to a plurality of communication recipients, the system comprising:
   a client interface;
   a server, having at least a processor and a data storage device;
   a network connection between said client interface and said server;
   a plurality of recipient interfaces, each of said recipient interfaces comprising means for receiving a critical communication from said server and conveying the critical communication to a communication recipient; and
   software operative on said processor to:
   a) receive recipient contact information for each of said plurality of recipient interfaces and store said recipient contact information in one or more predefined groups of communication recipients;
   b) receive communication input from said client interface that defines the critical communication;
   c) receive recipient input from said client interface regarding the identity of a group of communication recipients selected to receive the critical communication;
   d) receive broadcast input from said client interface that dictates when said server will contact said particular group of communication recipients selected to receive the critical communication;
   e) attempt to contact said particular group of communication recipients via said plurality of recipient interfaces;
   f) transmit the critical communication to said plurality recipient interfaces; and
   g) at least temporarily record contact data, relating to said attempt to contact said particular group of communication recipients, and formulate said contact data into one or more broadcast reports.

2. The system of claim 1 wherein said client interface is a computer device and said input that defines the critical communication is provided in a text format.

3. The system of claim 2 wherein said software is further operative to transmit the critical communication to said plurality of recipient interfaces as data that is translatable into a text format by said plurality of recipient interfaces.

4. The system of claim 3 wherein at least one of said recipient interfaces is a computer device.

5. The system of claim 1 wherein said client interface is a telephone and said input that defines the critical communication is provided in an audible format.

6. The system of claim 5 wherein said software is further operative to transmit the critical communication to said plurality recipient interfaces as data that is translatable into an audio format by said plurality recipient interfaces.

7. The system of claim 5 wherein said software is further operative to transmit the critical communication to said plurality recipient interfaces as data that is translatable by said plurality recipient interfaces as one of a plurality of different selectable voices or languages.

8. The system of claim 5 wherein at least one of said recipient interfaces is a telephone.

9. The system of claim 1 wherein said recipient contact information is comprised of a plurality of different contacts, relating to different types of recipient interfaces, for each of the communication recipients.

10. The system of claim 9 wherein said software is further operative to store and access said different contacts in a predefined hunt pattern for each of the communication recipients.

11. The system of claim 10 wherein said software is further operative on said processor to automatically initiate at least one additional attempt to contact a recipient, using said different contacts according to said predefined hunt pattern if a first attempt to contact the recipient is unsuccessful.

12. The system of claim 1 wherein said software is further operative to transmit a query to said recipient interfaces and receive recipient response data that is responsive to said query prior to transmitting said critical communication to said recipient interfaces.

13. The system of claim 12 wherein said software is further operative to receive audible recipient response data.

14. The system of claim 1 wherein said software is further operative to detect that a recipient interface has been answered by a message recording system and leave a message to have a recipient contact said server.

15. The system of claim 14 wherein said software is further operative to receive inbound communications from the communications recipients, via said recipient interfaces, in response to the critical communication.

16. The system of claim 1 wherein said software is further operative to receive input from a recipient and put said recipient in communication with a live client representative, contact center, or message board/IVR system.

17. The system of claim 16 wherein said software is further operative to provide a conference bridge that places a plurality or the communication recipients in communication with one another after transmitting the critical communication to said plurality recipient interfaces.

18. The system of claim 1 wherein said software is further operative to receive input from said client interface that redefines said particular group of communication recipients by including or excluding particular communication recipients according to a common selectable attribute.

19. The system of claim 1 wherein said software is further operative to receive input from said client interface that provides an alternate contact identity for one or more particular communications recipients.

20. The system of claim 19 wherein said software is further operative to store and access said alternate contact identify in a predefined hunt pattern for said one or more particular communication recipients.

21. The system of claim 1 wherein said software is further operative to receive input from said client interface that defines the rate at which communications recipients within said particular group of communication recipients are contacted.

22. The system of claim 21 wherein said software is further operative to receive input from a recipient and put said recipient in communication with a live client representative, contact center, or message board/IVR system.

23. The system of claim 1 wherein said software is further operative to recognize failed attempts by the system to contact one or more communications recipients within said particular group of communication recipients via said plurality of recipient interfaces and automatically initiate subsequent attempts to contact said one or more communications recipients within said particular group of communications recipients with whom the system failed to contact.

24. The system of claim 23 wherein said software is further operative to receive input from said client interface that defines the number of times the system will initiate subsequent attempts to contact said one or more communications recipients within said particular group of communications recipients with whom the system failed to contact.

25. The system of claim 1 wherein said software is further operative to record transmissions between said server and recipient interfaces, according to a selected recording pattern.

26. The system of claim 1 wherein said software is further operative to transmit a pre-selected, user-defined caller identification that sub plants an actual caller identification associated with said server.

27. The system of claim 1 wherein said software is further operative to make said broadcast reports available to said client interface in a real-time fashion.

28. The system of claim 1 wherein said software is further operative to receive input from said client interface that creates one or more user access levels that define access to and control over said recipient input received from said client interface.

29. The system of claim 28 wherein said one or more user access levels further define access to and control over said communication input from said client interface.

30. The system of claim 1 wherein said software is further operative to receive input from said client interface that defines one or more user permissions, which define access to and control over said recipient input.

31. The system of claim 30 wherein said one or more user permissions further define access to and control over said communication input.

32. The system of claim 1 wherein said software is further operative to receive input from said client interface that defines one or more user activities, which define access to and control over said broadcast input.

33. The system of claim 32 wherein said one or more user activities further define access to and control over user logins from said client interface.

34. The system of claim 1 wherein said software is further operative to receive input from said client interface that defines one or more user roles and responsibilities, which define access to and control over one or more types of input received from said client interface.

35. The system of claim 1 wherein said software is further operative to receive text inputs from said client interface, interpret said text inputs according to predefined phonetic spelling rules, and later transmit said text input as an audible, phonetic pronunciation of said text input.

* * * * *